United States Patent [19]
Poole et al.

[11] Patent Number: 5,620,591
[45] Date of Patent: Apr. 15, 1997

[54] HYDROCONVERSION PROCESS WITH PLUG-FLOW MOLYBDENUM CATALYST CONCENTRATE PREPARATION

[75] Inventors: Martin C. Poole; Thomas R. Halbert; Roby Bearden, all of Baton Rouge, La.; Stephen D. Reynolds, Kingwood, Tex.

[73] Assignee: Exxon Research & Engineering Company, Florham Park, N.J.

[21] Appl. No.: 362,072

[22] Filed: Dec. 22, 1994

[51] Int. Cl.$^6$ .................................................. C10G 47/02
[52] U.S. Cl. .......................... 208/112; 208/108; 208/420
[58] Field of Search ................................. 208/111, 215, 208/112, 108

[56] References Cited

U.S. PATENT DOCUMENTS

| | | | |
|---|---|---|---|
| 4,489,048 | 12/1984 | Kuch | 423/416 |
| 4,540,481 | 9/1985 | Sawyer et al. | 208/215 |
| 4,548,700 | 10/1985 | Bearden et al. | 208/108 |
| 4,637,870 | 1/1987 | Bearden et al. | 208/108 |
| 4,637,871 | 1/1987 | Bearden et al. | 208/112 |
| 4,719,002 | 1/1988 | Mayer | 208/112 |
| 4,740,489 | 4/1988 | Bearden, Jr. et al. | 502/150 |
| 5,053,376 | 10/1991 | Bearden, Jr. et al. | 502/150 |
| 5,108,581 | 4/1992 | Aldridge | 208/108 |
| 5,300,212 | 4/1994 | Winter, Jr. | 208/67 |

*Primary Examiner*—Helane Myers
*Attorney, Agent, or Firm*—Henry E. Naylor

[57] ABSTRACT

A hydroconversion process for converting a heavy hydrocarbonaceous feedstock to lower boiling products, which process involves the use of a sulfided catalyst concentrate which is prepared in a continuous plug-flow mode. The heavy hydrocarbonaceous feedstock is reacted with said catalyst concentrate in the presence of hydrogen at hydroconversion conditions.

7 Claims, 2 Drawing Sheets

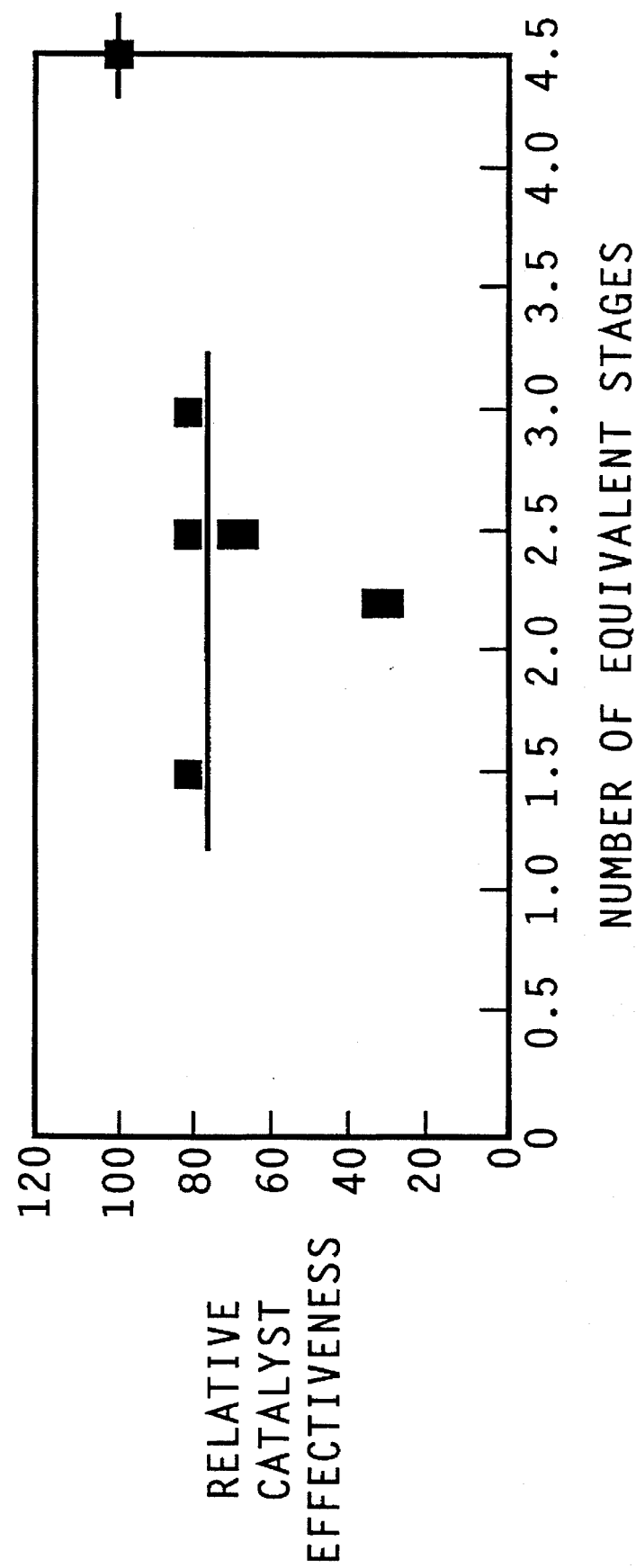

HYDROCONVERSION PROCESS WITH PLUG-FLOW MOLYBDENUM CATALYST CONCENTRATE PREPARATION

FIELD OF THE INVENTION

This invention relates to a hydroconversion process for converting a heavy hydrocarbonaceous feedstock to lower boiling products, which process involves the use of a sulfided catalyst concentrate which is prepared in a continuous plug-flow mode. The heavy hydrocarbonaceous feedstock is reacted with said catalyst concentrate in the presence of hydrogen at hydroconversion conditions.

BACKGROUND OF THE INVENTION

There is a substantial interest in the petroleum industry for converting heavy hydrocarbonaceous feedstocks to lower boiling liquids. One type of process which is suitable for the hydroconversion of heavy feedstocks is a slurry process using a catalyst prepared in a hydrocarbon oil from a thermally-decomposable, metal compound catalyst precursor. The catalyst can be formed as a concentrate in a portion of the heavy oil process feed, or it can be formed in situ in the hydroconversion zone.

Further, U.S. Pat. Nos. 4,740,295 and 4,740,489, both of which are incorporated herein by reference, teach a method wherein the catalyst is prepared from a concentrate which comprises phosphomolybdic acid dispersed in a portion of the feed. The precursor concentrate is sulfided prior to the final catalyst formation. This presulfiding step is taught to produce a catalyst having greater control over coke formation. The sulfiding agent in these two patents requires a hydrogen-sulfide containing gas or a hydrogen-sulfide precursor and the resulting catalyst concentrate is used for the hydroconversion of heavy hydrocarbonaceous materials to lower boiling products.

The term "hydroconversion" with reference to a heavy hydrocarbonaceous feedstock, is used herein to designate a catalytic process conducted in the presence of hydrogen in which at least a portion of the heavy constituents of the feedstock is converted to lower boiling products. The simultaneous reduction of the concentration of nitrogenous compounds, sulfur compounds and metallic constituents of the oil may also result.

It has been found that introducing a catalyst precursor as a concentrate in a hydrocarbonaceous oil into a hydroconversion zone containing a heavy hydrocarbonaceous feedstock has certain advantages when compared with a process wherein the catalyst precursor is introduced into the hydroconversion zone without first forming a concentrate, that is, by introducing the catalyst precursor directly into the feed in the reactor. The advantages include: (i) ease of mixing the precursor with a small stream instead of the whole feed; (ii) the ability to store the precursor concentrate for future use and/or activity certification; and (iii) the ability to use a hydrocarbonaceous oil, other than the feedstock, as the dispersing medium for the catalyst precursor, which hydrocarbonaceous oil other than the feedstock, can be more optimum for developing catalyst activity.

Further, it has also been found that converting a catalyst precursor concentrate to a catalyst concentrate comprised of solid catalyst particles dispersed in a hydrocarbonaceous oil and subsequently introducing a portion of this catalyst concentrate into the hydrocarbonaceous chargestock to be hydroconverted, with or without coal, will provide certain additional advantages, such as greater flexibility of conditions. Such advantages include: (i) use of higher concentrations of sulfiding agent than those concentrations that could practically be used to treat the total chargestock; (ii) flexibility of heat balance; and (iii) economy of energy. Treatment of only the catalyst precursor concentrate to produce the catalyst instead of treating the entire feedstock containing the catalyst precursor permits reduction of equipment size. Furthermore, preparing a catalyst concentrate permits storage of the catalyst concentrate for use as needed on-site or to send to another site.

It has also been found, and is claimed herein, that when elemental sulfur is used as the sulfiding agent in the preparation of the catalyst concentrate of this invention a critical range of atomic ratio of sulfur to metal of the metal compound exits. See U.S.Pat. Nos. 5,039,392 and 5,053,376 both of which are incorporated herein by reference. While the above mentioned hydroconversion processing art represents advances in the art, there is still a need for yet further advances, particularly with regard to increasing catalyst activity.

SUMMARY OF THE INVENTION

In accordance with the present invention, there is provided a process for hydroconverting a heavy hydrocarbonaceous chargestock to lower boiling products, which process comprises reacting the hydrocarbonaceous chargestock with a catalyst in the presence of hydrogen at hydroconversion conditions, said catalyst having been prepared by a method which comprises:

(a) forming a catalyst precursor concentrate by mixing together: (i) a sulfiding agent; (ii) a hydrocarbonaceous oil comprising constituents boiling above about 570° C.; (iii) an aqueous solution of a polyacid of molybdenum, in an amount to provide from about 0.2 to 2 wt. % metal, based on said hydrocarbonaceous oil, wherein the mixing is preformed in plug-flow mode with the substantial absence of back-mixing;

(b) drying the catalyst precursor concentrate mixture at an effective temperature and for an effective amount of time;

(c) heating the mixture in the substantial absence of added hydrogen at a temperature from about 275° to about 425° C. and a total pressure from about 0 psig to about 500 psig, for a time which is sufficient to convert said catalyst precursor to a solid molybdenum containing catalyst, thereby producing a catalyst concentrate.

(d) introducing said catalyst concentrate into a heavy hydrocarbonaceous stream;

(e) subjecting said catalyst-containing heavy hydrocarbonaceous stream to hydroconversion conditions which include temperatures from about 340° to 480° C. and hydrogen partial pressures from about 50 to 5000 psig, wherein at least 10 wt. % of said heavy hydrocarbonaceous stream contains components boiling above about 570° C.

In a preferred embodiment of the present invention, the sulfiding agent is elemental sulfur in an amount such that the atomic ratio of sulfur to molybdenum is from about 1/1 to 8/1.

In other preferred embodiments of the present invention, the polyacid is an aqueous solution of phosphomolybdic acid.

In yet other preferred embodiments of the present invention, the hydrocarbonaceous oil of step (i)(a) is a blend of a lighter oil with at least 10 wt. % heavier oil, said lighter oil boiling below about 570° C. and said heavier oil boiling above about 570° C.

In still another preferred embodiment of the present invention, the elemental sulfur is added as a concentrate in hydrocarbonaceous oil and is added to the precursor concentrate: (i) prior to the introduction of the precursor into the heating zone of step (b) or (ii) in the heating zone.

BRIEF DESCRIPTION OF THE FIGURES

FIG. 2 is a plot of Relative Catalyst Effectiveness vs. Number of Equivalent Stages, which show that catalysts prepared using less than four equivalent stages were less active than those catalysts prepared using four or more equivalent stages.

DETAILED DESCRIPTION OF THE INVENTION

Figure 1:
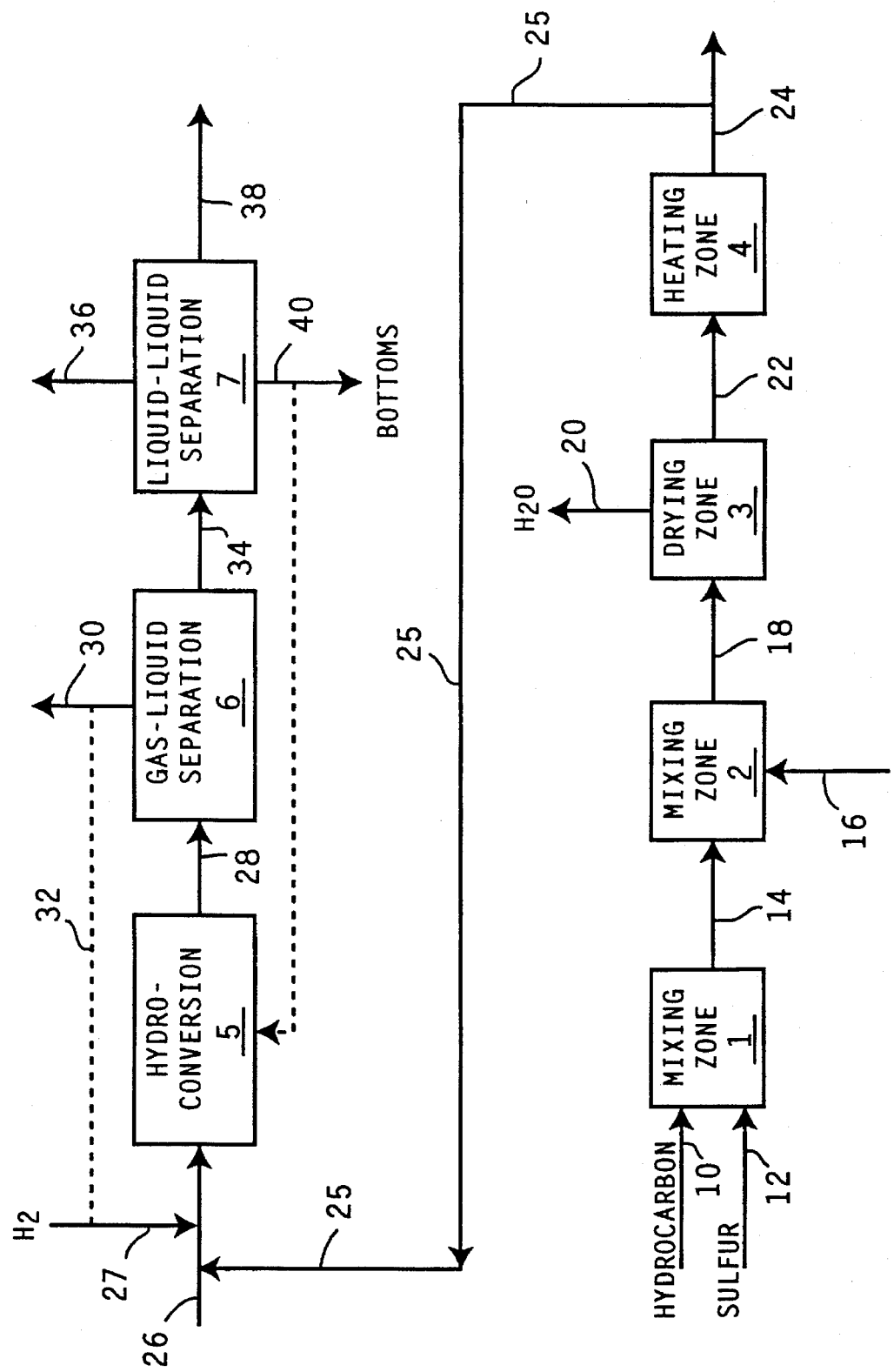
FIG. 1 is a schematic flow plan of one embodiment of the present invention.

All boiling points referenced herein are atmospheric pressure equivalent boiling points unless otherwise specified.

FIG. 1 hereof represents one of the preferred embodiments for carrying out the instant hydroconversion process and includes a gas-liquid separation zone and a liquid-liquid separation zone.

A heavy hydrocarbonaceous oil is introduced by line 10 into mixing zone 1. Suitable hydrocarbonaceous oils for introduction into mixing zone 1 include hydrocarbonaceous oils comprising constituents boiling above 570° C., preferably having at least 10 wt. % constituents boiling above 570° C., such as crude oils, atmospheric residua boiling above 330° C., and vacuum residua boiling above 570° C. Preferably, the hydrocarbonaceous oil has an initial boiling point above at least 330° C. and contains asphaltenes and/or resins. Most preferably, the hydrocarbonaceous oils comprise a lighter boiling oil boiling below about 570° C. and a heavier oil boiling above about 570° C. in a blend comprising at least about 22 wt. % materials boiling above 570° C. Preferred concentrations of the 570+° C. fraction in the blend include from about 22 to 85 wt. % heavier oil, more preferably from about 30 to 85 wt. % heavier oil, still more preferably about 40 to 85 wt. % heavier oil and, most preferably about 45 to 75 wt. % heavier oil, based on the total weight of the blend (mixture of oils). The light oil may be a gas oil and heavier oil may be a vacuum residuum. Alternatively, an atmospheric residuum having the appropriate mount of desired constituents may be used as the oil of line 10.

The hydrocarbonaceous oil carried by line 10 may be derived from any source, such as petroleum, tar sand oil, shale oil, liquids derived from coal liquefaction processes and mixtures thereof. Generally, these oils have a Conradson carbon content ranging from about 5 to about 50 wt. % (as to Conradson carbon, see ASTM test D-189-65).

A sulfiding agent is introduced into mixing zone 1 by line 12. Preferred sulfiding agents include $H_2S$, a blend of $H_2S$ and $H_2$, and elemental sulfur with or without hydrogen. Most preferred is elemental sulfur. The elemental sulfur, is preferably either a sublimed powder or a concentrated dispersion of sublimed powder, such as commercial Flowers of sulfur, in heavy hydrocarbonaceous oil. Allotropic forms of elemental sulfur, such as orthorhombic and monoclinic sulfur are also suitable for use herein. The preferred physical form of sulfur is the sublimed powder (flowers of sulfur), although sulfur may also be introduced as molten sulfur and as sulfur vapor. The amount of sulfur added into mixing zone 1 is such that the atomic ratio of sulfur to molybdenum is from about 1/1 to 8/1, preferably from about 2/1 to 7/1 and, more preferably from about 3/1 to 6/1. Alternatively, sulfur can be added at any point in the catalyst concentration preparation procedure as long as it is not contacted with an aqueous solution prior to being introduced into oil. For example, it can be added as a concentrate in a hydrocarbonaceous oil after the precursor concentrate has been dried. It can also be introduced into heating zone 4 during formation of the catalyst concentrate. If the elemental sulfur is added as a concentrate in oil, the amount of sulfur in the concentrate is such that it still meets the aforementioned requirements pertaining to atomic ratio of sulfur to metal. That is, the atomic ratio of sulfur to metal of the metal compound will remain 1/1 to 8/1.

The mixture from mixing zone 1 is passed to mixing zone 2 via line 14 where a catalyst precursor solution is introduced via line 16. It is preferred that the catalyst precursor be a polyacid of molybdenum. Preferred polyacids are those selected from the group consisting of heteropoly acids, such as the polyacids of molybdenum, preferably phosphomolybdic acid and molybdosilicic acid. Most preferred is phosphomolybdic acid. The term "phosphomolybdic acid" is used herein to designate aqueous solutions of the reaction product of $MoO_3$ with dilute phosphoric acid in which the phosphorus to molybdenum atomic ratio ranges from 0.083 to 2, preferably from 0.083 to 1 and most preferably from 0.083 to 0.5. Said solutions can contain one or more phosphomolybdic acid species such as the 12-molybdophosphoric acid and the dimeric 18-molybdophosphoric acid. Moreover, the crystalline 12 and 18 acids can be used to prepare the water solutions of phosphomolybdic acid used in the process of this invention. If such crystalline phosphomolybdic acids are used, additional $H_3PO_4$ or other phosphorus compounds may be added to the solution to provide the desired P/Mo ratio. Phosphomolybdic acids are described in *Topics In Current Chemistry No.* 76, published by Springer-Verlag of New York, pp. 1–64. 1978; which is incorporated herein by reference. A sufficient amount of the aqueous phosphomolybdic acid solution is introduced into mixing zone 2 to provide from about 0.2 to 2 wt. %, preferably from about 0.2 to 1 wt. %, more preferably 0.3 to 1 wt. % molybdenum from the phosphomolybdic acid, calculated as elemental molybdenum based on the hydrocarbonaceous oil. The resulting mixture is a water-containing catalyst precursor concentrate (i.e., wet catalyst precursor concentrate).

It is critical that mixing zone 2 be operated in plug-flow mode. That is, in the substantial absence of back-mixing. The terms "back-mixing" and "plug-flow" relate to residence time distribution of the catalyst precursor in the hydrocarbonaceous oil. One way of describing the residence time distribution of a mixing zone is in terms of the number of equivalent stages or "tanks in series" as described in *Chemical Reaction Engineering Second Edition*, Octave Levenspiel, 1972, pages 290–295, which is incorporated herein by reference. A completely back-mixed system is one in which there is one equivalent stage. A plug-flow system has an infinite number of mixing stages. Catalyst effectiveness vs. number of equivalent stages is shown in FIG. 2 hereof. As shown, catalyst effectiveness is about 30 to 80% of base for less than 4 stages. For 4 stages, the catalyst effectiveness reaches its maximum level. Thus, "plug-flow", as used herein, means a mixing zone comprised of two or more stages, preferably three or more stages, and more preferably four or more stages. The two or more stages can be conducted in one or more mixing vessels. That is, one mixing vessel can be used which is constructed in order to include two or more equivalent stages. In one preferred embodiment of the present invention, a single mixing vessel containing four stages is employed. In another preferred embodiment of the present invention, four stages are used wherein a separate mixing vessel is used for each stage. Further, plug-flow may also be accomplished by use of a coil reactor.

The catalyst precursor concentrate is removed from mixing zone 2 by line 18 and passed to drying zone 3 in which water is removed from the wet catalyst precursor concentrate by any suitable method. One suitable method would be to heat the catalyst precursor concentrate to a temperature sufficient to vaporize water, for example, at a temperature ranging from 100° to 150° C. The water is removed from drying zone 3 by line 20. The dried catalyst precursor concentrate is removed from drying zone 3 and is passed via line 22 to heating zone 4.

In heating zone 4, the dried catalyst precursor concentrate is heated, in the substantial absence of added hydrogen, to a temperature of at least about 275° C., preferably at a temperature ranging from about 275° C. to about 425° C., more preferably from about 315° C. to about 410° C. and, most preferably from 330° C. to about 400° C. The total pressure in heating zone 4 will range from about 0 psig to about 500 psig, preferably from about 0 psig to about 100 psig. The precursor concentrate is heated for an effective amount of time. By "effective amount of time" we mean that amount of time needed to convert the catalyst precursor to the corresponding catalyst concentrate. Heating zone 4 may be considered a catalyst formation zone in which the sulfur-containing catalyst precursor concentrate is convened to the solid catalyst concentrate. For example, where the phosphomolybdic acid precursor concentrate is converted to the solid molybdenum-containing catalyst. The heating zone will also be operated in the substantial absence of back-mixing as described above for mixing zone 2. That is, in a plug-flow mode.

The catalyst concentrate is removed from heating zone 4 by line 24. At least a portion of the catalyst concentrate is introduced, via line 25, into line 26 which carries a hydrocarbonaceous chargestock. The chargestock may contain a hydrocarbon which has the same boiling point range as the hydrocarbonaceous oil of line 10. The hydrocarbon may also be comprised of a single hydrocarbon (e.g., tetralin), or a mixture of hydrocarbons having the same, or different, boiling point range as the hydrocarbonaceous oil of line 10. The hydrocarbonaceous chargestock may be a hydrocarbonaceous oil or coal in a hydrocarbon diluent. Suitable hydrocarbonaceous chargestocks include crude oils; mixtures of hydrocarbons boiling above 220° C., preferably above 340° C.; for example, gas oils, vacuum residua, atmospheric residua, once-through coker bottoms and asphalt. The hydrocarbonaceous chargestock may be derived from any source, such as petroleum, shale oil, tar sand oil, oils derived from coal liquefaction processes, including coal liquefaction bottoms and mixtures thereof. Preferably, the hydrocarbonaceous oils have at least 10 wt. % materials boiling above 570° C. More preferably, the hydrocarbonaceous oils have a Conradson carbon content ranging from about 5 to about 50 wt. %. Coal may be added to any of these oils. Alternatively, slurries of coal in a hydrocarbon diluent may be used as chargestock to convert the coal (i.e., coal liquefaction). The diluent may be a single type of hydrocarbon or a mixture of hydrocarbons. It may be a light hydrocarbon or a heavy hydrocarbon, as described in U.S. Pat. No. 4,094,765, column 1, lines 54 to column 2, line 43, the teaching of which is hereby incorporated herein by reference.

When the chargestock, into which at least a portion of the catalyst concentrate is introduced, is a hydrocarbonaceous oil, the concentrate disperses in the oil. If the chargestock is comprised of coal in a diluent, the concentrate may be added to the diluent before, after, or simultaneously with the addition of coal to the diluent. A hydrogen-containing gas is introduced by line 27 into line 26. The mixture of hydrocarbonaceous chargestock, catalyst concentrate, and hydrogen is passed into slurry hydroconversion zone 5. The catalyst concentrate of line 25 is added to the hydrocarbonaceous chargestock in an amount sufficient to provide from about 10 to about 2000 wppm, preferably from about 50 to 1000 wppm, more preferably from about 50 to 800 wppm molybdenum and, most preferably from about 50 to 300 wppm metal, calculated as the elemental metal, preferably molybdenum, based on the total hydroconversion zone chargestock, i.e., concentrate plus carbonaceous chargestock.

Suitable hydroconversion operating conditions are summarized below.

| Conditions | Broad Range | Preferred Range |
|---|---|---|
| Temperature, °C. | 340 to 480 | 440 to 465 |
| $H_2$ Partial Pressure, psig | 50 to 5000 | 100 to 2500 |

The hydroconversion zone effluent is removed by line 28 and passed to a gas-liquid separation zone 6 wherein the normally gaseous phase is separated from a normally liquid phase. The gaseous phase is removed from separation zone 6 by line 30. Alternatively, the gaseous phase, which contains hydrogen, may be recycled by line 32, preferably after removal of undesired constituents, to slurry hydroconversion zone 5 via line 27. The normally liquid phase, which comprises the molybdenum-containing catalytic solids and a hydroconverted hydrocarbonaceous oil product, is passed by line 34 to separation zone 7 for fractionation by conventional means, such as distillation, into various fractions; such as light, medium boiling, and heavy bottoms fractions. The light fraction is removed by line 36. The medium boiling fraction is removed by line 38. The heavy bottoms fraction is removed by line 40 and, if desired, at least a portion of the bottoms fraction may be recycled to the hydroconversion zone.

Furthermore, if desired, the catalytic solids may be separated from the hydroconverted oil product and the separated solids may be recycled to the hydroconversion zone.

In a broader aspect of the instantly-claimed invention, a metal compound (catalyst precursor), other than an aqueous solution of molybdenum polyacid, is introduced into one or both of the mixing zones. Of course, if an aqueous solution is not used, there is no need for the drying step. The catalyst precursor may be a compound or mixture of compounds as finely divided solids, or a compound or mixture of compounds as finely divided solids mixed with an organic liquid that is soluble in said hydrocarbonaceous oil, a compound or mixture of compounds that is soluble in the hydrocarbonaceous oil or a compound that is soluble in an organic compound (liquid medium) that can be dispersed in the hydrocarbonaceous oil. It can also be a compound that is water soluble and the resulting aqueous solution dispersed in the hydrocarbonaceous material. For example, the metal compound may be in a phenolic medium, in water, in alcohol, etc. Suitable metal compounds convertible (under preparation conditions) to solid, metal-containing catalysts include: (1) inorganic metal compounds such as carbonyls, halides, oxyhalides; polyacids such as isopolyacids and; (2)

metal salts of organic acids such as acyclic and cyclic aliphatic carboxylic acids and thiocarboxylic acids containing two or more carbon atoms (e.g., naphthenic acids); aromatic carboxylic acids (e.g., toluic acid); sulfonic acids (e.g., toluenesulfonic acid); sulfinic acids; mercaptans; xanthic acids; phenols, di- and poly-hydroxy aromatic compounds; (3) organometallic compounds such as metal chelates, e.g., with 1,3-diketones, ethylenediamine, ethylenediaminetetraacetic acid, phthalocyanines, etc.; (4) metal salts of organic amines such as aliphatic amines, aromatic amines and quaternary ammonium compounds.

The metal constituent of the metal compound that is convertible to a solid, non-colloidal, metal-containing catalyst is selected from the group consisting of Groups IVB, VB, VIB, VIIB and VIII and mixtures thereof of the Periodic Table of the Elements. The Periodic Table of the Elements referred to herein is published by Sergeant-Welsh Scientific Company being copyrighted in 1979 and available from them as Catalog Number S-18806. Non-limiting examples include zinc, antimony, bismuth, titanium, cerium, vanadium, niobium, tantalum, chromium, molybdenum, tungsten, manganese, rhenium, iron, cobalt, nickel and the noble metals including platinum, iridium, palladium, osmium, ruthenium and rhodium. The preferred metal constituent of the metal compound is selected from the group consisting of molybdenum, tungsten, vanadium, chromium, cobalt, titanium, iron, nickel and mixtures thereof. Preferred compounds of the given metals include the salts of acyclic (straight or branched chain) aliphatic carboxylic acids, salts of cyclic aliphatic carboxylic acids, polyacids, carbonyls, phenolates and organoamine salts.

Such metal compounds are described in U.S. Pat. No. 4,295,995, the teachings of which are incorporated herein by reference. The preferred metal compounds are inorganic polyacids of metals selected from Groups VB, VIB and mixtures thereof, that is, vanadium, niobium, chromium, molybdenum, tungsten and mixtures thereof. Suitable inorganic polyacids include phosphomolybdic acid, phosphotungstic acid, phosphovanadic acid, silicomolybdic acid, silicotungstic acid, silicovanadic acid and mixtures thereof. The preferred polyacid is a phosphomolybdic acid. The terms "heteropolyacids" and "isopolyacids" are used herein in accordance with the definitions given in Advanced Inorganic Chemistry, 4th Edition, by S. A. Cotton and Geoffrey Wilkinson, Interscience Publishers, New York, pages 852–861.

The following examples are presented to illustrate the invention and should not be construed as limiting the invention.

EXAMPLES

The catalyst precursor concentrates of these examples were prepared in a stainless steel, stirred reactor with multiple mixing zones. Vacuum residuum from heavy crude oil and aqueous phosphomolybdic acid were continuously added. Prior to catalyst preparation, the stirred reactor was calibrated using the tracer techniques. Mixing speed, and residence time were varied, and the residence time distribution was measured, using flowing water, a dye tracer, and a visible light spectrophotometer. A correlation for residence time distribution for the stirred reactor was established.

The stirred reactor was used to prepare a series of catalyst concentrates, in which the mixer speed and residence time were varied. From the correlation for residence time distribution, the number of equivalent stages for each catalyst preparation was determined.

Each of the catalyst preparations were tested in a standard catalyst activity test. The results of the activity tests are shown in FIG. 2 hereof. As shown in FIG. 2, those catalysts prepared using less than four equivalent stages were less active than those catalysts prepared using four or more stages.

EXAMPLE 1

Step A

A 200 gallon stainless steel vessel was charged with 857 lb. of crude oil feed that contained 51.6 wt. % components boiling above 525+° C., had 13.6 wt. % Conradson Carbon, and which exhibited an initial boiling point of 232° C. The crude oil was heated to about 80° C. and 6.4 lb. of sublimed sulfur was stirred into it and the mixture was held at 80° C. for about 45 minutes.

Step B

The crude oil/sulfur mixture was added, with stirring, into a 750 cc reactor at a rate of 10 lb./hr. The mixture was heated to a temperature of 80° C. The reactor was constructed to contain four equivalent stages. A 5% solution of phosphomolybdic acid (PMA) was then added to said reactor at a rate of about 1 lb./hr. with stirring. The residence time of PMA in said reactor is about 10 minutes. The concentration of Mo was calculated to be about 0.5 wt. %.

Step C

The aqueous PMA/sulfur/oil mixture of Step B above was continuously fed to a series of three tubular reactors and heated to 177° C. to vaporize the water thereby providing a substantially water-free catalyst precursor concentrate. The oil, containing the added PMA, as a dissolved solid, was separated from the vaporized water by distillation.

EXAMPLE 2

Hydroconversion experiments were carried out to show that the staging in Step B of Example 1 is necessary to assure good catalyst performance. To a 300 cc stirred Autoclave Engineer's autoclave was charge 119.1 g of Cold Lake crude plus 0.88 g of low pressure presulfided catalyst precursor concentrate of Example 1 to provide 350 wppm of molybdenum in the charge. The autoclave was flushed with $H_2$, pressure tested, and vented to atmospheric pressure, then pressured with 50 psig of $H_2S$ and the to 1650 psig with $H_2$. The autoclave was heated to 385° C. and held at that temperature for 10 minutes. This pretreatment step was used to convert the catalyst precursor to the catalyst concentrate.

A continuous flow of hydrogen, 0.36 l/min, was then established with a back pressure regulator holding at 2100 psig. The temperature was increased to 443° C. and held there for 3 hours, after which the flow of hydrogen was stopped. The autoclave was blocked off and quickly cooled to about 90° C.

Gaseous products in the autoclave were vented at about 90° C., caustic scrubbed, measured (volume) and collected for analysis by mass spectrometry. Gaseous products that were collected during the run were also collected and analyzed.

Liquid and solid products from the hydroconversion reaction were washed from the autoclave with toluene and the toluene wash was filtered to recover the solids, which solids comprise catalyst residues and toluene insoluble coke. After washing with toluene, the solids were dried under vacuum at 100° C. for one hour, weighed and analyzed for carbon content.

Toluene insoluble coke yield was calculated as follows.

wt. % toluene insoluble coke =

$$\left[ \frac{\left( \begin{array}{c} \text{Grams toluene insoluble solids} \times \\ \text{wt. fraction carbon} \end{array} \right)}{\frac{0.85}{\text{g. feed}}} \right] \times 100$$

Unconverted 525+° C. material was recovered from the combined toluene filtrate and washed by distillation. The 525+° C. product was analyzed to determine residual Conradson Carbon content.

EXAMPLE 3

This example is intended to illustrate the benefits of preforming the catalyst under plug flow conditions in a tubular reactor. Catalyst precursor concentrate was fed to a coil reactor (¼" O. D. by 100', 18 gauge stainless steel) at the rate of 2 lb./hr. The coil reactor was maintained at a temperature of 365° C. in a sandbath. Inert gas (nitrogen) was also fed to the reactor at a rate of 1.2 SCF/hr., and the reactor outlet maintained at a pressure of 200 psig. The resulting preformed catalyst concentrate was tested for activity as described in Example 2, and shown to have a relative activity of 0.97.

EXAMPLE 4

This example is intended to illustrate the detrimental effects of preforming the catalyst under continuous back-mixed conditions. A sample of the same catalyst precursor concentrate utilized for Example 3 was fed to a continuous stirred tank reactor (50 cc internal volume autoclave) at a rate of 50 cc per hour. The reactor was maintained at a temperature of 355° C. After a suitable period of time for reaction, the resulting preformed catalyst concentrate was collected and tested for activity as described in Example 2, and shown to have relative activity <0.5.

EXAMPLE 5

This example is intended to demonstrate that the incorporation of an inert gas in the coil preforming process is unnecessary. Catalyst precursor concentrate prepared as described in Example 1 was fed to a coil reactor (⅜" O. D. by 100', 16 gauge stainless steel) at the rate of 2.4 lb./hr. The coil reactor was maintained at a temperature of 365° C. No gas was fed with the precursor concentrate. However, reactor outlet pressure of 200 psig was maintained by maintaining a slow flow of nitrogen in the low temperature separator vessel downstream of the reactor. The resulting preformed catalyst concentrate was tested for activity as described in Example 2, and shown to be fully active.

What is claimed is:

1. A process for hydroconverting a heavy hydrocarbonaceous chargestock to lower boiling products, which process comprises reacting the hydrocarbonaceous chargestock with a catalyst in the presence of hydrogen at hydroconversion conditions, said catalyst having been prepared by a method which comprises:

(a) forming a catalyst precursor concentrate by mixing together: (i) a sulfiding agent; (ii) a hydrocarbonaceous oil comprising constituents boiling above about 570° C.; (iii) an aqueous solution of a polyacid of molybdenum, in an amount to provide from about 0.2 to 2 wt. % metal, based on said hydrocarbonaceous oil, wherein the mixing is preformed in plug-flow mode in at least four equivalent stages, with the substantial absence of back-mixing;

(b) drying the catalyst precursor concentrate mixture at an effective temperature and for an effective amount of time;

(c) heating mixture in the substantial absence of oxided hydrogen at a temperature from about 275° to about 425° C. and a total pressure from about 0 psig to about 500 psig, for a time which is sufficient to convert said catalyst precursor to a solid molybdenum containing catalyst, thereby producing a catalyst concentrate.

(d) introducing said catalyst concentrate into a heavy hydrocarbonaceous stream;

(e) subjecting said catalyst-containing heavy hydrocarbonaceous stream to hydroconversion conditions which include temperatures from about 340° to 480° C. and hydrogen partial pressures from about 50 to 5000 psig, wherein at least 10 wt. % of said heavy hydrocarbonaceous stream contains components boiling above about 570° C.

2. The process of claim 1 wherein the polyacid is selected from phosphomolybdic acid and molybdosilicic acid.

3. The process of claim 2 wherein the polyacid is phosphomolybdic acid.

4. The process of claim 1 wherein the sulfiding agent is elemental sulfur in an amount such that the atomic ratio of sulfur to molybdenum is from about 1/1 to 8/1.

5. The process of claim 1 wherein the hydrocarbonaceous oil of step (a)(ii) is a blend of a lighter oil with at least 10 wt. % heavier oil, said lighter oil boiling below about 570° C. and said heavier oil boiling above about 570° C.

6. The process of claim 1 wherein the heating zone is operated at a temperature of about 315° to 410° C.

7. The process of claim 1 wherein the hydroconversion conditions include temperatures of 440° to 465° C. and pressures of about 100 to 2500 psig.

* * * * *